No. 828,027. PATENTED AUG. 7, 1906.
A. F. HANSON.
CLUTCH.
APPLICATION FILED NOV. 18, 1905.
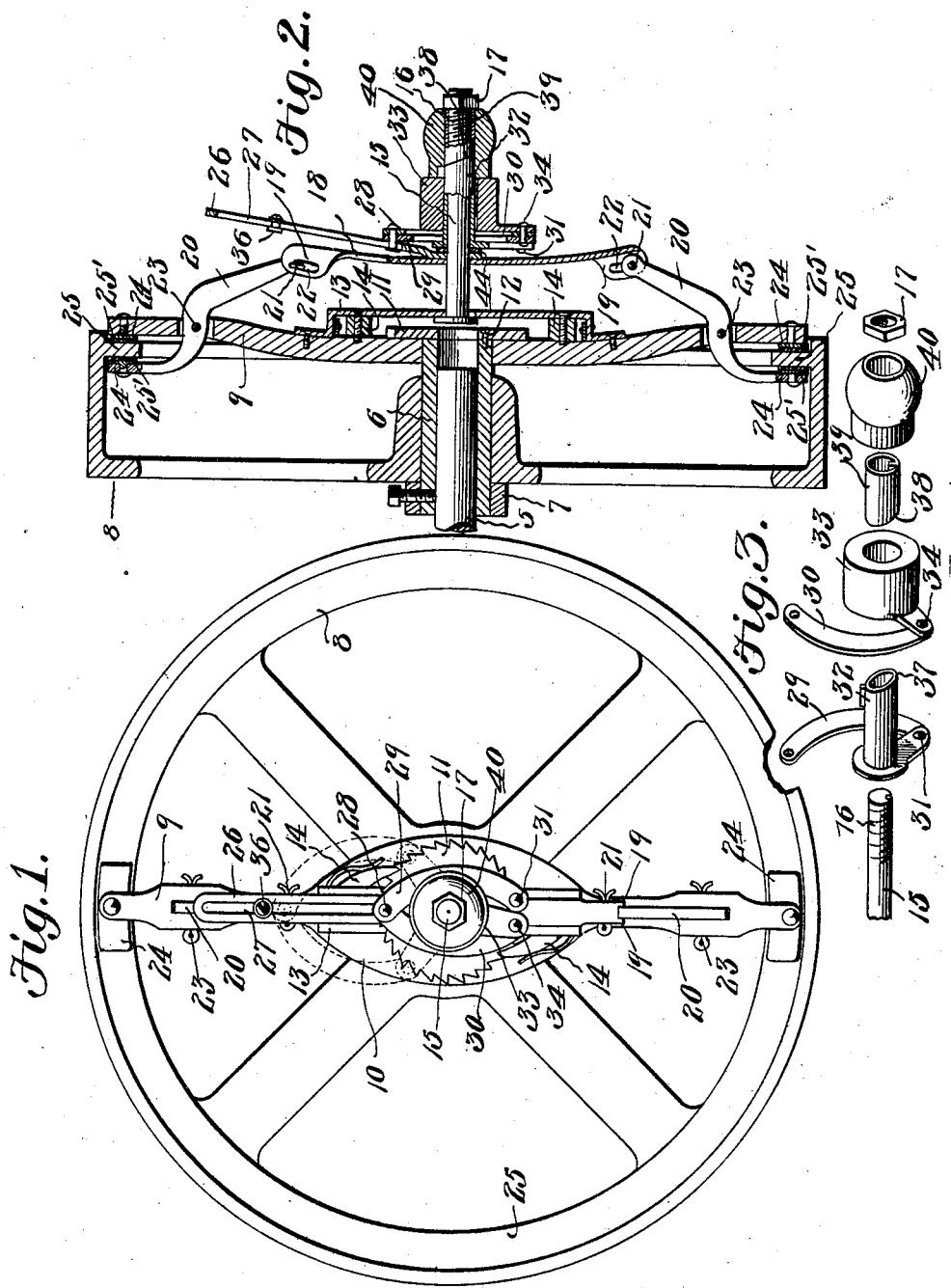
Witnesses
Adolph F. Hanson, Inventor.
by C. A. Snow & Co.
Attorneys

UNITED STATES PATENT OFFICE.

ADOLPH F. HANSON, OF GOWRIE, IOWA.

CLUTCH.

No. 828,027.      Specification of Letters Patent.      Patented Aug. 7, 1906.

Application filed November 18, 1905. Serial No. 288,006.

*To all whom it may concern:*

Be it known that I, ADOLPH F. HANSON, a citizen of the United States, residing at Gowrie, in the county of Webster and State of Iowa, have invented a new and useful Clutch, of which the following is a specification.

This invention relates to clutches, and more particularly to that class of clutches adapted for use in connection with cream-separators and other machinery driven by explosive-engines, its object being to provide a friction-clutch of this character by means of which a uniform rotary motion may be imparted to the operating-shaft of the separator or other driven element.

A further object of the invention is to provide novel means for regulating the pressure exerted by the brake-shoes on the clutch-pulley and means for moving the brake-shoes to operative and inoperative positions while the clutch-pulley is in motion.

A still further object of the invention is to generally improve this class of devices so as to add to their utility and durability, as well as to reduce the cost of manufacture.

With these and other objects in view the invention consists in the construction and novel combination and arrangement of parts hereinafter fully described, illustrated in the accompanying drawings, and pointed out in the claims hereto appended, it being understood that various changes in form, proportions, and minor details of construction may be resorted to without departing from the principle or sacrificing any of the advantages of this invention.

In the accompanying drawings, forming a part of this specification, Figure 1 is a front elevation of a friction-clutch constructed in accordance with my invention. Fig. 2 is a longitudinal sectional view of the same, and Fig. 3 is a detail perspective view of the actuating-collars, sleeves, clamping-nut, and a portion of the threaded rod detached.

Similar numerals of reference indicate corresponding parts in all the figures of the drawings.

The improved clutch, while capable of being used in connection with various kinds of machinery, is principally designed for transmitting motion from an explosive-engine or similar source of power to the operating-shaft of a cream-separator, a portion of said separator-shaft being shown at 5.

Secured to and mounted for rotation with the shaft or driven element 5 is a sleeve 6, carrying a collar 7, which bears against the clutch-pulley or driving element 8, the latter being loosely mounted for rotation on the sleeve 6, as shown.

Extending transversely of the pulley 8 and mounted for rotation on the sleeve 6 is a bar 9, the central portion of which is enlarged, as indicated at 10, to form a bearing for a ratchet-wheel 11, which latter is rigidly secured to the adjacent end of the sleeve in any suitable manner, as by screws 12. Pivotally mounted between a bracket 13 and the enlargement 10 are spring-pressed pawls 14, the free ends of which engage the teeth on the ratchet-wheel and cause the bar 9 to rotate with the sleeve 6 when the latter is traveling in one direction, but permits independent backward movement of said bar.

Seated in the bracket 13 is one end of a rod 15, the free end of which is provided with terminal threads 16 for engagement with a clamping member or nut 17. Mounted for sliding movement on the rod 15 is a clutch-bar 18, preferably formed of spring metal and having its opposite ends provided with spaced ears 19, adapted to receive brake-levers 20, said brake-levers being pivoted to the bar 18 by means of pins 21, which pass through alined slots or openings 22 in said ears, as shown. The intermediate portions of the levers 20 are pivoted at 23 in openings in the bar 9, and the free ends thereof are extended laterally and provided with terminal openings in which are seated brake-shoes 24, adapted to engage an inwardly-extending flange 25 on the clutch-pulley or driving member 8. The active faces of the brake-shoes 24 are provided with bearing-surfaces of leather, felt, rubber, or other yieldable material 25', and pivotally mounted on the opposite ends of the bar 9 are similar shoes also provided with yieldable bearing-surfaces, as shown.

Rigidly secured to the clutch-bar 18 and extending in the same longitudinal plane therewith is a guide-bar 26, having an elongated slot 27 formed therein, in which is mounted for sliding movement the pivoted ends 28 of a pair of curved arms 29 and 30. The arm 29 is pivoted at 31 to the extension of a sleeve 32, the latter being loosely mounted on the rod 15 and provided with a collar 33, which is in turn pivoted at 34 to the curved arm 30. The free end of the bar 26 is spaced a short distance from the clutch-bar 18 to permit free longitudinal movement of the pivoted ends of the arms 29 and 30 within the slot 27 when the collar 33 is moved to depress the clutch-bar 18 and actuate the brake-shoes, as will be more fully explained hereafter. Slidably mounted in the slot 27 is an adjustable stop 36, which by engagement with the pivoted ends 28 of the curved arms serves to limit the expansible movement of said arms, and thereby regulate the throw of the arms, and consequently the pressure exerted by the brake-shoes on the flange of the clutch-pulley. The sleeve 32 is formed with a cam-face 37, which engages the corresponding cam-face 38 of a sleeve 39, which sleeve is keyed on the rod 15 and provided with an operating-collar or knob 40, keyed, as shown, to the sleeve 32, the several sleeves and collars being retained in position on the rod by means of the clamping-nut 17, as shown.

A washer 44 is preferably interposed between the fixed end of the guide-bar 26 and the adjacent end of the sleeve 32 to prevent excessive wear on said guide-bar.

In operation the clutch-pulley is connected to the driving-pulley of the gas-engine through the medium of a belt or similar connection and the arms 29 and 30 contracted or moved to the position shown in Fig. 1 by rotating the collar 33. As the collar 33 is rotated the sleeve 32 is also rotated through the medium of the arm 29, thus causing the cam-face 37 to engage the cam-face 38 and depress the clutch-bar 18, thereby causing the latter to tilt the brake-shoes into engagement with the flange 25 and rotate the shaft 5. The nut 17 is then adjusted to move the sleeves 32 and 39, together with the collars 33 and 40, longitudinally of the rod 15 to thereby exert an additional pressure on the clutch-bar until the separator has attained its maximum speed, the pressure exerted by the brake-shoe being such as to permit the pulley to slip a little between the shoes when starting the gas-engine to prevent the sudden jerking movement of the latter from being transmitted to the cream-separator shaft. As a cream-separator runs a great deal easier at regular speed, as soon as such speed is attained the pressure of the brake-shoes is relieved slightly by adjusting the clamping-nut.

To release the brake-shoe, in stopping the separator, it is merely necessary to hold the collar or knob 40 for an instant, which causes the cam 37 to engage the cam 38 and rotate the sleeve 32 to expand the arms 29 and 30, and thus release the clutch-bar. The brake-shoes may also be moved to operative position while the device is in motion by holding the collar 33.

When the clutch is used in connection with cream-separators having a ratchet for preventing backward movement of the gearing, the ratchet-wheel 11 and pawls 14 may be dispensed with and the cross-bar 9 and sleeve 6 cast or otherwise formed integral.

Having thus described the invention, what is claimed is—

1. In a clutch, a driving member, a driven member, a plurality of sets of gripping devices adapted to engage one of said members, a yieldable member connecting one of the gripping devices of each set, means for depressing the yieldable member thereby to actuate the gripping devices, and means for locking said gripping devices in operative position.

2. In a clutch, a driving member, a driven member, a bar carried by and extending transversely across one of said members, brake-shoes pivotally mounted on the opposite ends of said bar and adapted to engage the adjacent member, a yieldable member connecting the brake-shoes, and means for depressing the yieldable member to actuate the brake-shoes.

3. In a clutch, a driving member, a driven member, a rod carried by one of said members, brake-shoes adapted to engage the other member mounted on the rod and a yieldable member connecting the brake-shoes, and means carried by the rod for depressing the yieldable member to actuate the brake-shoes.

4. In a clutch, a driving member, a driven member, a rod carried by one or said members, gripping devices adapted to engage the other member, a yieldable member connecting the gripping devices, a collar mounted on the rod, and means carried by the collar for depressing the yieldable member to actuate the gripping devices.

5. In a clutch, a driving member, a driven member, a rod carried by one of said members, gripping devices adapted to engage the other member, a yieldable member connecting the gripping devices, means carried by the rod for depressing the yieldable member to actuate the gripping devices, and means independent of the actuating means for releasing the gripping devices.

6. In a clutch, a driving member, a driven member, a rod carried by one of said members, gripping devices adapted to engage the other members, a yieldable member connecting the gripping devices, a plurality of collars carried by the rod for actuating the yieldable member to apply and release the gripping devices, and a clamping member mounted on the rod and adapted to engage the collars.

7. In a clutch, a driving member, a driven member, a rod carried by one of said members, gripping devices adapted to engage the other member, a yieldable member connecting the gripping devices, a bar carried by the yieldable member, a collar mounted on the rod for depressing the yieldable member to actuate the gripping devices, and levers slidably mounted on the bar and pivotally connected with the collar.

8. In a clutch, a driving member, a driven member, a rod carried by one of said members gripping devices adapted to engage the other member, a yieldable member connecting the gripping devices, a plurality of collars carried by the rod and provided with inter-engaging cam-faces, a slotted bar secured to the yieldable member, levers pivotally mounted for sliding movement in the slot of the bar and pivotally connected with one of said collars for depressing the yieldable member, and means for limiting the sliding movement of said levers.

In testimony that I claim the foregoing as my own I have hereto affixed my signature in the presence of two witnesses.

ADOLPH F. HANSON.

Witnesses:
C. G. MESSEROLE.
C. E. YOUNGQUIST